US 6,658,097 B2

(12) United States Patent
Höfer et al.

(10) Patent No.: US 6,658,097 B2
(45) Date of Patent: Dec. 2, 2003

(54) CODEC CIRCUIT AND METHOD FOR INCREASING THE DATA TRANSMISSION RATE DURING A MODEM TRANSMISSION

(75) Inventors: Gerald Höfer, Langerringen (DE); Herbert Zojer, Villach (AT); Stephan Wimösterer, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/037,465

(22) Filed: Dec. 21, 2001

(65) Prior Publication Data

US 2002/0126747 A1 Sep. 12, 2002

Related U.S. Application Data

(63) Continuation of application No. PCT/DE00/01753, filed on May 30, 2000.

(51) Int. Cl.[7] ............................................. H04M 11/00
(52) U.S. Cl. ................................................. 379/93.28
(58) Field of Search ..................... 379/93.28, 93.29, 379/93.31, 93.32, 93.33, 93.34, 93.09, 93.08, 93.01, 399.02

(56) References Cited

U.S. PATENT DOCUMENTS

| 4,788,692 A | 11/1988 | Takebayashi et al. ......... 375/27 |
| 6,411,618 B1 * | 6/2002 | Quiring et al. .............. 370/359 |

FOREIGN PATENT DOCUMENTS

| WO | WO99/38351 | 7/1999 | ........... H04Q/11/04 |
| WO | WO99/40685 | 8/1999 | |
| WO | WO01/01667 | 1/2001 | ........... H04Q/11/04 |

OTHER PUBLICATIONS

Warke, Nirmal and Ali, Murtaza, "Optimum CODEC Companding for High–Speed PCM Data Transmission in Telephone Networks," 1999 IEEE International Conference on Acoustics, Speech, and Signal Processing, Proceedings, Mar. 1999, pp. 2679–2682, Phoenix, AZ, XP002162341.

Heigl, Hans–Peter, "Chipsatz für eine 'low cost' Linecard," 202 Funkschau, 63(1991), Sep. 6, No. 19, pp. 74–78, Munich, Germany, XP000261120. (Partial translation provided).

* cited by examiner

*Primary Examiner*—Stella Woo
(74) *Attorney, Agent, or Firm*—Withrow & Terranova, PLLC

(57) ABSTRACT

Codec circuit for increasing the data transmission rate in a modem transmission with a first programmable digital filter (13) which is connected into a transmission signal path of the Codec circuit, a second programmable digital filter (22) which is connected into a reception signal path of the Codec circuit, a modem signal detection device (31) for detecting whether the transmission signal which is output on the transmission signal path or the reception signal which is received on the reception signal path is a modem signal, the modem signal detection device (31) switching the first and second digital filters (13, 22) to a widened filter bandwidth when a modem signal is detected.

21 Claims, 2 Drawing Sheets

CODEC CIRCUIT AND METHOD FOR INCREASING THE DATA TRANSMISSION RATE DURING A MODEM TRANSMISSION

PRIORITY DATA

This application is a continuation of International Application No. PCT/DE00/01753, filed May 30, 2000, pending, which claims the benefit of German application no. DE 199 29 205.1, filed Jun. 25, 1999, pending.

FIELD OF THE INVENTION

The invention relates to a Codec circuit and a method for increasing the data transmission rate of a modem, in which messages are transmitted digitally with pulse code modulation.

BACKGROUND OF THE INVENTION

A Codec circuit is a piece of equipment which carries out PCM coding in the outgoing direction and PCM decoding in the incoming direction.

N. Warke, M. Ali "Optimum Codec Companding for High-Speed PCM Data Transmission in Telephone Networks", 1999 IEEE International Conference on Acoustics, Speech, and Signal Processing, Proceedings, ICASSP99, March 1999(pages 2679 to 2682, XP002162341, Phoenix, Ariz., USA) discloses a Codec circuit having a transmission signal path and a reception signal path. During the acquisition of a specific pseudo-random number code at the start of a modem transmission, switching over to a linear compression curve is performed in order to increase the data transmission rate.

U.S. Pat. No. 4,788,692 describes an adaptive differential PCM system with a detection device for acquiring a modem signal. When a modem signal is detected, a quantizer is switched over by the detection device in order to transmit a modem signal in an optimum way.

Pulse code modulation (PCM) is a time-division multiplex system which permits multiple transmission on one line path. PCM systems are constructed and operated using digital technology. They provide a better transmission quality than comparable analog systems. PCM systems can be used for cable lines which are not suitable for carrier frequency operation. Multi-conductor cables can be used fully in the time-division multiplex method. A disadvantage of PCM systems is the increasing of the necessary bandwidth which the code-modulated signal has in comparison with other types of signals. During the transmission of signals, at the transmit end, the incoming signals are limited in the frequency band to 3.4 kHz, sampled, quantized and fed to the coder which forms the associated code words, transmitted from the transmission location to the reception location, for the successive amplitude values. At the reception location, the transmitted signals are decoded and converted into a pulse amplitude modulated signal and demodulated.

Modems are devices for transmitting data signals over telephone channels by means of modulation. In previous Codec circuits according to the prior art, the PCM coding was carried out in the outgoing direction and PCM decoding was carried out in the incoming direction, regardless of whether the signals to be coded originate usual voice signals from a telephone apparatus or from a modem. The transmission properties of known Codec circuits are the same for the coding of telephone signals and modem signals. The result of this is that the data transmission of modem signals takes place in the same frequency bandwidth as the data transmission of telephone voice signals, namely within a frequency band which extends from approximately 100 Hz as the lower limiting frequency up to approximately 3.4 kHz as the upper limiting frequency. Because the data transmission rate is directly proportional to the frequency bandwidth of the frequency band which can be used, the transmission rate in Codec circuits is limited by the transmission frequency band which extends from approximately 100 Hz to 3.4 kHz.

The object of the present invention is therefore to provide a method and a Codec circuit for increasing the data transmission rate in a modem data transmission.

SUMMARY OF THE INVENTION

In an advantageous embodiment of the Codec circuit according to the invention, the programmable digital filters are bandpass filters with a lower limiting frequency and an upper limiting frequency.

The setting coefficients of the digital switchover filters can preferably be stored in the associated coefficient memory.

This provides the particular advantage that the transmission properties can be adapted rapidly and flexibly to the transmission requirements of the modem circuit by storing other setting coefficients of the digital switchover filters.

The coefficient memories of the Codec circuit according to the invention are preferably connected to a coefficient input device via setting lines.

In one preferred embodiment of the Codec circuit according to the invention, the digital switchover filters are connected at the output end to a summing device.

The digital switchover filters of the Codec switches according to the invention are preferably filters of the seventh order.

In one preferred embodiment of the Codec circuit according to the invention, the modem signal detection device detects a modem signal by acquiring an initial signal tone with a predetermined signal frequency at the start of the modem transmission.

The transmission and reception signals which are transmitted on the transmission signal path and the reception signal path are preferably PCM signals.

A preferred embodiment of the Codec circuit according to the invention will be described below in order to explain features which are essential to the invention, with reference to the appended drawings.

DETAILED DESCRIPTION OF THE DRAWING FIGURES

DETAILED DESCRIPTION OF THE PREFERRED EMBODIMENTS

Figure 1:
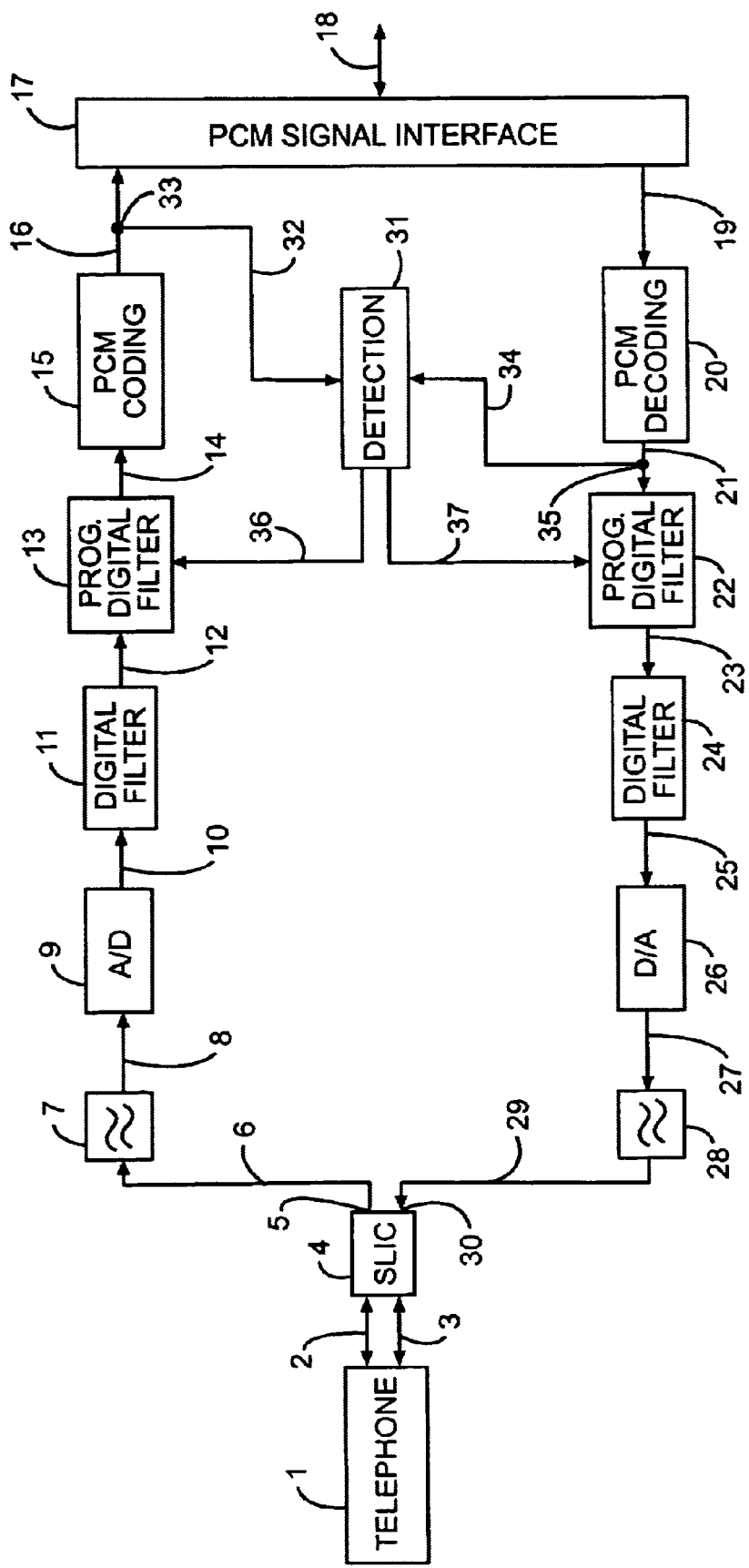
FIG. 1 is a block diagram of the Codec circuit according to the invention.

FIG. 1 shows a block diagram of the Codec circuit according to the invention for increasing the data transmission rate for a modem data transmission according to the invention.

A telephone apparatus 1 is connected bidirectionally via connecting lines 2, 3 to what is referred to as an SLIC (Subscriber Line Interface Circuit). The SLIC 4 is an integrated semiconductor component for digital switching which performs what are referred to as the Borscht functions. Borscht is a made-up word for describing the functions of a subscriber circuit in a switching office. These functions form the word BORSCHT with their initial letters. The functions are in particular central battery mode (battery feed), overvoltage protection, subscriber calling (ringing), signaling, PCM conversion (coding), hybrid and test functions (testing).

The SLIC 4 has an analog signal output 5 which is connected to an analog prefilter 7 via a line 6. The analog prefilter 7 is preferably a low-pass filter. The analog prefilter 7 outputs the filtered output signals via a line 8 to an analog/digital converter 9. The analog/digital converter 9 preferably samples the received analog signal with a sampling rate of 4 MHz. The digital sampled signal which is generated by the analog/digital converter 9 is fed to a digital filter 11 via a line 10. The digital filter 11 is preferably a digital low-pass filter whose filter properties are permanently set. The output signal of the digital filter 11 is transmitted to a programmable digital filter 13 via a line 12. The filter properties of the programmable digital filter 13 are not permanently set but rather can be set or switched over. The programmable digital filter 13 is connected at the output end to a PCM coding device 15 via a line 14. The PCM coding device 15 codes the filtered signal received via the line 14 to form a PCM transmission signal which is output to a PCM interface 17 via the line 16.

The PCM signal interface 17 transmits and receives coded PCM signals with a data transmission rate of preferably 64 kbit per second. The PCM signal is preferably coded here as an eight-digit PCM code word. The PCM signals transmitted through the PCM signal interface and the received PCM signals are transmitted and received by means of a PCM signal transmission line 18. The PCM signals received by the PCM signal interface are fed to a PCM decoding device 20 via a line 19.

The PCM decoding device 20 decodes the received PCM signal and outputs it to a further programmable digital filter 22 via a line 21. The programmable digital filter 22 is similar in structure to the programmable digital filter 13, it being possible to set and switch over the filter properties. The programmable digital filter 22 filters the received decoded PCM reception signal and outputs it in filtered form at the output end to a digital filter 24 via a line 23. The filter properties of the digital filter 24 are permanently set, i.e. the digital filter 24 is not programmable. The digital filter 24 is preferably a digital low-pass filter. The digital filter 24 is connected to a digital/analog converter 26 via a line 25. The digital/analog converter 26 converts the received filtered digital signal into an analog signal which is fed via a line 27 to an analog post-filter, preferably an analog low-pass filter 28. The analog post-filter 28 applies the decoded filtered analog PCM signal to the analog signal input 30 of the SLIC via a line 29.

The Codec circuit according to the invention shown in FIG. 1 additionally has a modem signal detection device 31. The modem signal detection device is connected in the example shown in FIG. 1 to the transmission signal line 16 via an acquisition line 32 at a branching node 33. Furthermore, the modem signal detection device 31 is connected to the output line 21 of the PCM decoding device 20 via a further acquisition line 34 at a branching node 35. The modem signal detection device 31 controls the two programmable filters 13, 22 via control lines 36, 37. The modem signal detection device 31 of the Codec circuit according to the invention determines, via the acquisition lines 32, 34, whether the transmission signal which is output on the transmission signal line 16 or the reception signal which is received on the reception signal line 21 is a modem signal. The acquisition lines 32, 34 of the modem signal detection device 31 can branch off the transmission signal at any desired point on the transmission signal path, and the reception signal at any desired point on the reception signal path of the Codec circuit. For example the branching point 33 shown in FIG. 1 can apply the transmission signal to the output end of the analog/digital converter 9 for modem signal detection. A modem signal is acquired if the telephone apparatus 1 shown in FIG. 1 is switched over to a modem for outputting a modem data signal, or a modem signal is received from a distant modem via the line 18. The modem signal detection device 31 preferably acquires a modem signal here by detecting a modem starting signal tone with a predetermined signal frequency, which occurs at the start of each modem transmission.

As soon as the modem signal detection device 31 detects a modem signal on the transmission signal path or the reception signal path of the Codec circuit according to the invention, it switches over the programmable digital filter 13 and the programmable digital filter 22 to a widened filter bandwidth via the control lines 36, 37.

Figure 2:
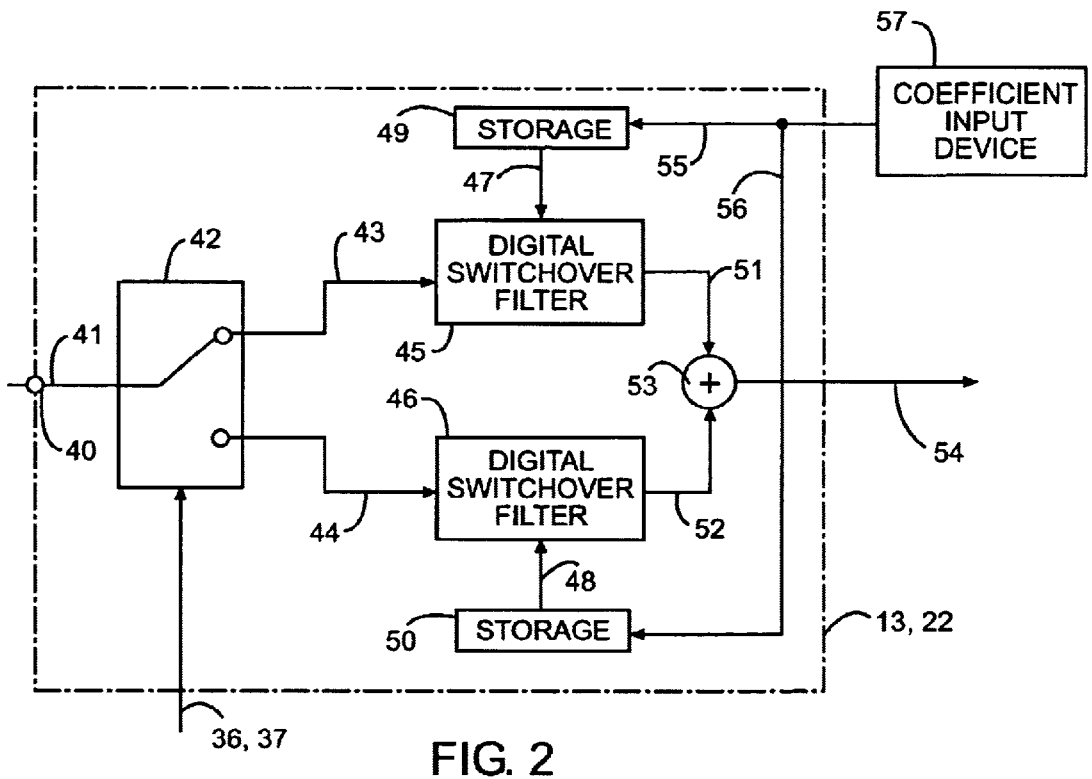
FIG. 2 is a block diagram of the programmable digital filters which are contained in the Codec circuit according to the invention which is shown in FIG. 1.

FIG. 2 shows the internal structure of the two programmable digital filters 13, 22 which are illustrated in FIG. 1.

The programmable digital filters 13 and 22 have an input signal terminal 40 which is connected to a controllable switching device 42 via an internal input line 41. The controllable switching device 42 switches the input line 41 between a line 43 and a line 44 as a function of a control instruction which is applied to the control line 36 or 37. The internal line 43 of the programmable digital filter connects the input line 41 to an internal digital switchover filter 45, and the internal line 44 connects the input line 41 to a further digital switchover filter 46. The digital switchover filters 45 and 46 are each connected to internal storage devices 49, 50 via setting lines 47, 48. The digital switchover filters 40, 46 filter the digital input signals applied to the internal lines 43, 44 and conduct them via lines 51, 52 to a summing element 53 which outputs the signals filtered by the switchover filters 45, 46, via the output line 54. The output line 54 in FIG. 2 corresponds to the output line 14 in the programmable digital filter 13 shown in FIG. 1, and to the output line 23 in the programmable digital filter 22.

The internal storage devices 49, 50 of the programmable digital filter 13, 22 are connected to a coefficient input device 57 via setting lines 55, 56. The setting coefficients of the digital switchover filters 45, 46 can be stored in the internal storage devices 49, 50. These stored setting coefficients of the digital switchover filters 45, 46 can be reprogrammed and reset in accordance with the transmission requirements via the setting lines 55, 56 by means of the coefficient input device 57.

The digital switchover filter 45 is preferably a digital bandpass filter with a lower limiting frequency and an upper limiting frequency. The lower limiting frequency in this case is approximately 100 to 200 Hz, and the upper limiting frequency is 3.4 kHz. The switchover filter 46 is preferably a digital bandpass filter with a lower limiting frequency and an upper limiting frequency, the lower limiting frequency being approximately 100 to 200 Hz, and the upper limiting frequency being approximately 4 kHz.

The frequency bandwidth of the digital switchover filter 46 is always higher than the filter bandwidth of the digital switchover filter 45, and thus permits a higher data transmission rate.

If, as illustrated in FIG. 1, a normal telephone call is conducted from the telephone apparatus 1 to another, distant telephone apparatus, the controllable switching device 42 of the programmable digital filters 13, 22 illustrated in FIG. 2 is switched in such a way that the input line 41 is connected to the internal line 43. In this switched setting, the telephone call signal is conducted via the digital switchover filter 45 with the normal low filter bandwidth of, for example, 3.4 kHz. If, conversely, the modem signal detection device 31 shown in FIG. 1 detects, for example from a modem starting signal tone at the start of the modem transmission, that the transmitted signal is a modem signal and not a usual telephone call signal, the modem signal detection device outputs a control signal via the control lines 36, 37 to the programmable digital filters 13, 22 illustrated in FIG. 2. These control signals control the controllable switching device 42 in such a way that the input signal line 41 is switched to the internal line 45. The detected modem signal is thus conducted via the digital switchover filter 46 with the increased filter bandwidth of, for example, 4 kHz.

If the PCM signal is coded into code words comprising 8 bits, and if the transmission rate is 64 kbits per second, a sampling rate of 8 kHz, and thus a maximum bandwidth of 4 kHz, is obtained.

The switching over, carried out when a modem signal is detected, from a digital filter 45 with a relatively low filter bandwidth to a digital filter 46 with an increased filter bandwidth has the effect of enabling the transmission rate of modem data signals to be considerably increased.

The preferred embodiment of the digitally programmable filters 13, 22 shown in FIG. 2 has two internal digital switchover filters 45, 46. In alternative embodiments, the programmable digital filters 13, 22 of the Codec circuit according to the invention not only have two digital switchover filters 45, 46 but also a multiplicity of internal digital switchover filters. It thus becomes possible also to adapt the transmission properties of the Codec circuit according to the invention as a function of which modem the modem signal originates from. For this purpose, the modem signal detection device 31 of the Codec circuit according to the invention detects not only whether or not a modem signal is present but also what type of modem the modem signal originates from, and controls the programmable digital filters correspondingly.

Figure 3:
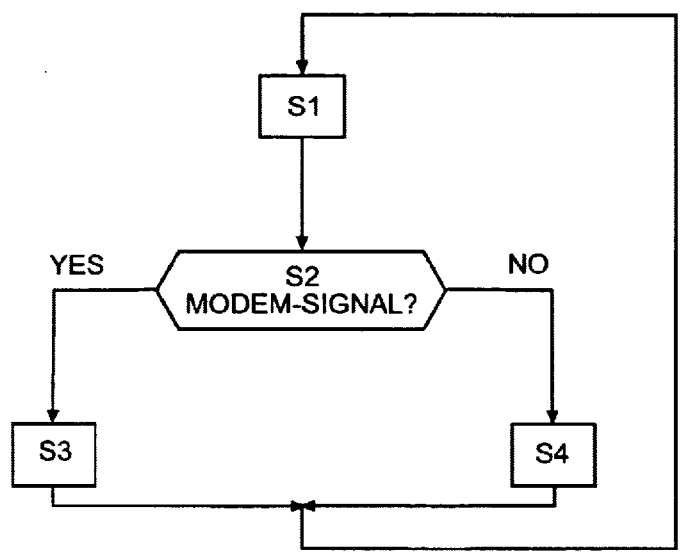
FIG. 3 is a flowchart of the method according to the invention for increasing the data transmission rate for a modem data transmission according to the invention.

FIG. 3 shows a flowchart representing the method according to the invention for increasing the data transmission rate in the case of a modem transmission. In a step S1, the transmission signal which is transmitted by the Codec circuit on the transmission signal path and the reception signal which is received on the reception signal path, which is preferably a PCM signal, are acquired.

In step S2, the acquired signal is evaluated and it is detected, for example by means of a predefined modem starting tone at the start of each modem data transmission, whether the acquired PCM signals are customary telephone signals or whether they are modem signals.

If a modem signal is detected, the two filters 13, 22 illustrated in FIG. 1 are switched in step S3 in such a way that their filter bandwidth is increased.

If, conversely, it is detected in step S2 that there is no modem signal present, the two programmable digital filters 13, 22 which are illustrated in FIG. 1 are switched in step S4 in such a way that they have the normal telephone call filter bandwidth.

In order to increase the filter bandwidth of the programmable digital filters 13, 22, in step S3 the switchable control device 42 is switched to the digital switchover filter 46 with increased filter bandwidth.

The Codec circuit according to the invention and the method according to the invention for increasing the data transmission rate for a modem data transmission permit, in the case of a voice signal connection, compliance with specifications and thus a high quality of the voice connection, and simultaneously have optimized operating properties for a modem data signal transmission. The operating properties which are optimized for a modem data signal transmission would infringe the respective specifications in the case of a customary telephone call connection and are therefore used only for the modem data signal transmission.

For this purpose, in the Codec circuit according to the invention the filter structures are widened, it being additionally possible to freely program or set the filter properties.

What is claimed is:

1. A Codec circuit for increasing the data transmission rate in a modem transmission having
    (a) a programmable digital transmission filter (13) which is provided in a transmission signal path of the Codec circuit;
    (b) a programmable digital reception filter (22) which is provided in a reception signal path of the Codec circuit;
    (c) and having a modem signal detection device (31) for detecting whether the transmission signal which is output on the transmission signal path or the reception signal which is received on the reception signal path is a modem signal, wherein
    (d) the programmable digital filters (13, 22) each contain a first digital switchover filter (45) with a small filter bandwidth and a second digital switchover filter (46) with an increased filter bandwidth,
    (e) which can be switched over by the modem signal detection circuit (31) by means of a controllable switching device (42).

2. The Codec circuit as claimed in claim 1, wherein the programmable digital filters (13, 22) are bandpass filters with a lower limiting frequency and an upper limiting frequency.

3. The Codec circuit as claimed in claim 2, wherein setting coefficients of the digital switchover filters (45, 46) can be stored in associated coefficient memories (49, 50).

4. The Codec circuit as claimed in claim 3, wherein the coefficient memories are connected to a coefficient input device (57) via setting lines (55, 56).

5. The Codec circuit as claimed in claim 1, wherein the digital switchover filters (45, 46) are connected at the output end to a summing device (52).

6. The Codec circuit as claimed in claim 2, wherein the digital switchover filters (45, 46) are connected at the output end to a summing device (52).

7. The Codec circuit as claimed in claim 3, wherein the digital switchover filters (45, 46) are connected at the output end to a summing device (52).

8. The Codec circuit as claimed in claim 4, wherein the digital switchover filters (45, 46) are connected at the output end to a summing device (52).

9. The Codec circuit as claimed in claim 1, wherein the digital switchover filters (45, 46) are filters of the seventh order.

10. The Codec circuit as claimed in claim 2, wherein the digital switchover filters (45, 46) are filters of the seventh order.

11. The Codec circuit as claimed in claim 3, wherein the digital switchover filters (45, 46) are filters of the seventh order.

12. The Codec circuit as claimed in claim 4, wherein the digital switchover filters (45, 46) are filters of the seventh order.

13. The Codec circuit as claimed in claim 5, wherein the digital switchover filters (45, 46) are filters of the seventh order.

14. The Codec circuit as claimed in claim 1, wherein the transmission and reception signal is a PCM signal.

15. The Codec circuit as claimed in claim 2, wherein the transmission and reception signal is a PCM signal.

16. The Codec circuit as claimed in claim 3, wherein the transmission and reception signal is a PCM signal.

17. The Codec circuit as claimed in claim 4, wherein the transmission and reception signal is a PCM signal.

18. The Codec circuit as claimed in claim 5, wherein the transmission and reception signal is a PCM signal.

19. The Codec circuit as claimed in claim 6, wherein the transmission and reception signal is a PCM signal.

20. A method for increasing the data transmission rate in a modem data transmission having the following steps:
   a) the signals transmitted by a Codec circuit on a transmission signal path or received on a reception signal path are acquired;
   b) it is detected whether the acquired signals are modem signals, wherein
   c) the filter bandwidths of filters which are provided in the transmission and reception signal path of the Codec circuit are increased if the acquired signals are detected as being modem signals.

21. The method as claimed in claim 20, wherein a modem signal detection device (31) detects a modem signal by acquiring an initial signal tone with a predetermined signal frequency at the start of the modem transmission.

* * * * *